(12) United States Patent
Magenheimer (10) Patent No.: US 7,877,747 B2
(45) Date of Patent: Jan. 25, 2011

(54) FLEXIBLE OPERATING SYSTEM OPERABLE AS EITHER NATIVE OR AS VIRTUALIZED

(75) Inventor: Daniel J. Magenheimer, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2106 days.

(21) Appl. No.: 10/784,065

(22) Filed: Feb. 20, 2004

(65) Prior Publication Data

US 2005/0188374 A1  Aug. 25, 2005

(51) Int. Cl.
G06F 9/455 (2006.01)
G06F 9/46 (2006.01)
G06F 9/00 (2006.01)
G06F 15/177 (2006.01)

(52) U.S. Cl. ............... 718/1; 718/104; 713/2; 713/100

(58) Field of Classification Search ............. 718/1–108; 713/1, 2, 100
See application file for complete search history.

(56) References Cited

U.S. PATENT DOCUMENTS

| | | | | |
|---|---|---|---|---|
| 4,779,187 A * | 10/1988 | Letwin | ...................... | 712/229 |
| 5,023,771 A * | 6/1991 | Kishi | ......................... | 710/260 |
| 5,038,281 A | 8/1991 | Peters | | |
| 5,222,215 A | 6/1993 | Chou et al. | | |
| 5,367,661 A | 11/1994 | Hough et al. | | |
| 5,432,927 A * | 7/1995 | Grote et al. | .................... | 713/2 |
| 5,437,033 A * | 7/1995 | Inoue et al. | ................... | 714/10 |
| 6,178,503 B1 * | 1/2001 | Madden et al. | ................ | 713/2 |
| 6,199,159 B1 * | 3/2001 | Fish | ............... | 713/2 |
| 6,230,118 B1 * | 5/2001 | Bader et al. | ................... | 703/24 |
| 6,397,242 B1 | 5/2002 | Devine et al. | | |
| 6,496,847 B1 | 12/2002 | Bugnion et al. | | |
| 6,658,563 B1 * | 12/2003 | Ice et al. | ....................... | 713/2 |
| 6,725,289 B1 * | 4/2004 | Waldspurger et al. | .......... | 710/9 |
| 6,738,977 B1 * | 5/2004 | Berry et al. | ................. | 719/332 |
| 6,819,961 B2 * | 11/2004 | Jacobs et al. | .................. | 700/17 |
| 7,010,634 B2 * | 3/2006 | Silvester | ..................... | 710/303 |
| 7,032,107 B2 * | 4/2006 | Stutton et al. | .................. | 713/2 |
| 7,103,626 B1 * | 9/2006 | Recio et al. | ................. | 709/201 |
| 7,209,994 B1 * | 4/2007 | Klaiber et al. | ............. | 710/264 |
| 7,228,408 B2 * | 6/2007 | Wu et al. | ....................... | 713/1 |
| 7,549,042 B2 * | 6/2009 | Glaum et al. | ............... | 713/100 |
| 2002/0016909 A1 * | 2/2002 | Miyajima | ...................... | 713/2 |
| 2002/0082823 A1 | 6/2002 | Traut | | |
| 2002/0082824 A1 | 6/2002 | Neiger et al. | | |
| 2002/0099532 A1 | 7/2002 | Traut | | |
| 2002/0152334 A1 | 10/2002 | Holm et al. | | |

(Continued)

OTHER PUBLICATIONS

Paul Barham; Xen and the Art of Virtualization; Oct. 2003; SOSP'03 ACM.*

(Continued)

*Primary Examiner*—Lewis A Bullock, Jr.
*Assistant Examiner*—Abdullah Al Kawsar (57) ABSTRACT

According to at least one embodiment, a flexible operating system comprises operability for executing in a first manner as a native operating system on a computer system and for executing in a second manner as a virtualized operating system on the computer system. The flexible operating system further comprises code for determining whether it is being used as a native operating system or as a virtualized operating system on the computer system.

36 Claims, 4 Drawing Sheets

U.S. PATENT DOCUMENTS

| | | | |
|---|---|---|---|
| 2002/0152344 | A1 | 10/2002 | Holm et al. |
| 2002/0156934 | A1 | 10/2002 | Gregg et al. |
| 2002/0194241 | A1 | 12/2002 | Griffin et al. |
| 2002/0194496 | A1 | 12/2002 | Griffin et al. |
| 2003/0023839 | A1* | 1/2003 | Burkhardt et al. .............. 713/1 |
| 2003/0120856 | A1 | 6/2003 | Neiger et al. |
| 2004/0003222 | A1* | 1/2004 | Rich et al. ..................... 713/1 |
| 2004/0111578 | A1* | 6/2004 | Goodman et al. ........... 711/163 |
| 2004/0117532 | A1* | 6/2004 | Bennett et al. .............. 710/260 |
| 2005/0091365 | A1* | 4/2005 | Lowell et al. ............... 709/224 |

OTHER PUBLICATIONS

"VMware Workstation", [Online]—2 pages Retrieved on Jan. 8, 2004 Retrieved from: http://www.vmware.com/products/desktop/ws_features.html.

"Running Guest Operating Systems", Version 4, Release 3.0, IBM—171 pages, 2002.

Barham, P., et al., "Xen and the Art of Virtualization", SOSP '03, Oct. 2003,—14 pages.

Whitaker, A. et al., "Denali: Lightweight Virtual Machines for Distributed and Networked Applications", The University of Washington—14 pages, 2002.

Whitaker, A. et al., "Denali: A Scalable Isolation Kernel", The University of Washington—6 pages, 2002.

Whitaker, A. et al., "Scale and Performance in the Denali Isolation Kernel", The University of Washington—15 pages, 2002.

Intel, " Intel Itanium Architecture Software Developer's Manual", vol. 2, System Architecture, Rev. 2.0, Dec. 2001, Document 245318-003. Title page, table of contents and Section 11.1 Firmware Model, pp. 2:253-2:263 provided. Complete document will be provided upon request).

Varian, Melinda, "VM and the VM Community: Past, Present, and Future", Office of Computing and Information Technology, Princeton University, 68 pages, 1997.

* cited by examiner

FLEXIBLE OPERATING SYSTEM OPERABLE AS EITHER NATIVE OR AS VIRTUALIZED

FIELD OF THE INVENTION

The below description relates in general to operating systems, and more specifically to a flexible operating system that is operable as either a native or as a virtualized (e.g., paravirtualized) operating system.

DESCRIPTION OF RELATED ART

As computer performance increases, it becomes more desirable to utilize available performance flexibly and efficiently. On even the smallest personal computer, multiprocessing enables several applications to share the processor. Other techniques such as virtual memory and input/output ("I/O") device abstraction support the illusion that each application on a system controls all physical resources, or even more resources than are physically available in the system. In the pursuit of efficiency, one thing has remained constant: general-purpose operating systems assume that they have complete control of the system's physical resources. The operating system ("OS") thus assumes responsibility for allocation of physical resources, communication and management of external storage.

Virtualization changes the above assumption of sole responsibility by a single OS for management of the system (e.g., allocation of physical resources, communication and management of external storage). Similar to the way that a general-purpose OS presents the appearance to multiple applications that each has unrestricted access to a set of computing resources, a virtual machine manages a system's physical resources and presents them to one or more OSs, thus creating for each OS the illusion that it has full access to the physical resources that have been made visible to it.

Many such virtualized environments use an intermediary layer referred to as a Virtual Machine Monitor ("VMM"), such as the VMM known as VMware™ available from VMware, Inc. (see http://www.vmware.com), to allow different OSs to co-exist in an uncooperative architecture. Essentially, VMM is a software layer that virtualizes the available resources of a computer and multiplexes them among one or more guest OSs on a computer system. Implementing a VMM can be fairly straightforward if the target architecture is designed to support virtualization but quite complex if not (i.e., the target is an "uncooperative" architecture). If the Instruction Set Architecture (ISA) of a machine conforms to certain constraints, such as being able to be represented as an exact duplicate by the VMM, it is fully virtualizable. Unfortunately, these constraints are not met for many "uncooperative" architectures, including without limitation the predominant x86 and Itanium architectures.

Ideally, an OS should be able to run without modification on a VMM, while retaining the illusion that it is running directly on physical hardware and owns all resources. Different methods have been suggested to support this illusion on an architecture that is not fully virtualizable, and such methods typically result in significant performance degradation. For example, some VMMs intentionally compromise the virtual machine interface in exchange for greater performance. For example, VMware™ provides an add-on driver which, when loaded by a Windows™ guest, greatly reduces the I/O overhead. With "pure" virtualization, the VMM layer attempts to make the presence of each OS on a system transparent. That is, each OS is unaware of the presence of the other OSs. Thus, each OS runs exactly as it would if it were the sole OS on the system, and the intermediary VMM layer oversees the operation of each OS and performs mediation when needed for maintaining the transparency. For example, in a case in which a guest OS attempts to perform a privileged operation, the VMM mediates (or modifies) the operation to achieve cooperation (or sharing of system resources) between the various OSs on the system. In general, a "privileged operation" is an operation or hardware instruction for which execution is restricted to the "most privileged level" provided by the hardware. This most privileged level (often referred to as privilege level zero, or "PL0") is usually reserved for the OS. However, if the OS has been virtualized, its privilege level is less privileged (e.g., to PL1) and the most privileged level (PL0) is used solely by the VMM. For instance, suppose a guest OS attempts to query the system for the memory that is present on the system, the VMM may recognize this as a privileged operation and may return to the guest OS only a portion of the system's memory that is allocated to that guest OS (to prevent the OS from attempting to utilize a portion of memory allocated to another OS running on the system). Of course, the mediation actions performed by the VMM layer degrades performance. In some instances, because of the mediation actions performed by the VMM layer, the system's applications may run approximately 30 to 50% slower on a guest OS than they would on a corresponding native OS on which such mediation actions are not performed.

To improve performance, a technique known as paravirtualization has been proposed. In pure virtualization, when an unchanged OS running virtualized attempts to execute a privileged operation, the hardware "traps" the attempt. The trap is intercepted by the VMM which decides whether to execute the operation on behalf of the OS or take some other action. In a paravirtualized OS, the OS is modified to take an equivalent action rather than attempt to execute certain privileged operations directly. Such equivalent action is usually some kind of "call" to the VMM, which can usually be implemented substantially faster than the hardware trap. For instance, in this technique the VMM may provide an explicit application program interface ("API") and allow or require a guest OS to port to the VMM. The paravirtualization technique has been shown in some projects to reduce the performance loss of a guest OS versus a corresponding native OS to 5% or less.

While paravirtualization techniques improve performance (i.e., reduce the amount of performance diminishment experienced by a guest OS), these techniques require OS modifications, which can be problematic in the real world (especially if the modifications are significant). First, if substantial modification is required, the OS provider may summarily reject the necessary changes. This is true not only for proprietary OSs but also for open source OSs. Second, in a research or academic environment, OS variations are common and it is fairly reasonable to expect a separate OS image for operation in a virtual environment. In a production environment, however, loading a different OS image is unwieldy. Additionally, for a commercial OS provider, doubling the number of distributed OS images (i.e., maintaining different OS images for native versus paravirtualized OS implementations) presents undesirable burdens concerning maintenance and support for the OSs.

BRIEF SUMMARY OF THE INVENTION

According to at least one embodiment, a flexible operating system comprises operability for executing in a first manner as a native operating system on a computer system and for executing in a second manner as a virtualized operating system on the computer system. The flexible operating system further comprises code for determining whether it is being used as a native operating system or as a virtualized operating system on the computer system.

DETAILED DESCRIPTION

Figure 1:
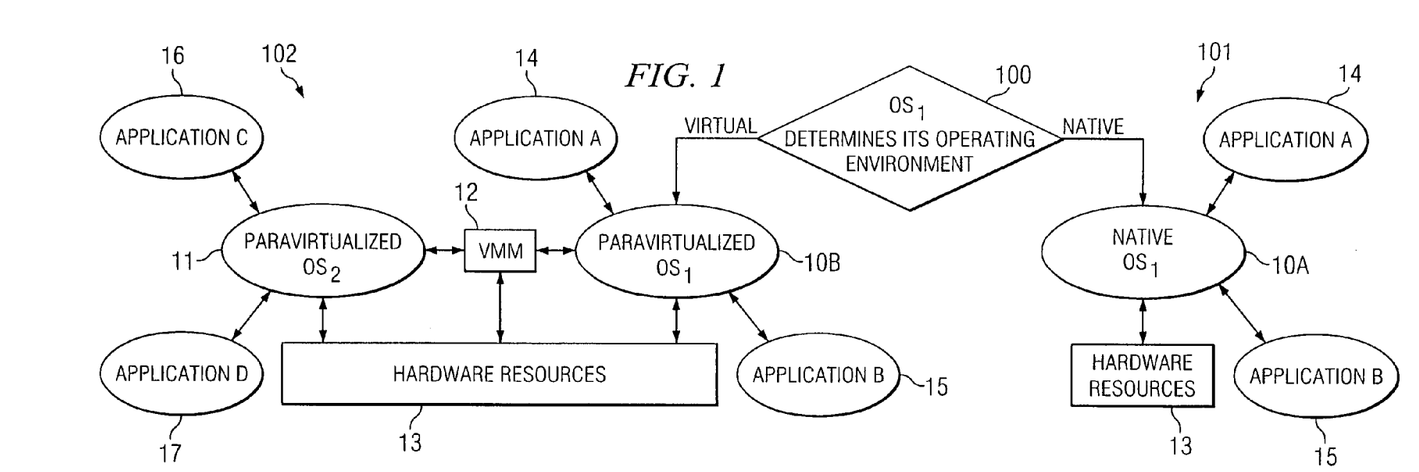
FIG. 1 shows a logical representation of one embodiment of a flexible OS that is capable of recognizing whether it is being used as a native or a virtualized OS in a computer system and adapt its operation accordingly.

FIG. 1 shows a logical representation of one embodiment of a flexible OS that is capable of recognizing whether it is being used as a native or as a virtualized (e.g., guest) OS in a computer system and adapt its operation accordingly. In decision block 100, an operating system, $OS_1$, determines its operating environment. That is, OS, determines whether it is operating as a native OS or as a virtualized OS in its respective computer system. Example techniques for determining the OS's operating environment are described further below. In certain embodiments, during the boot-up process of the computer system a global variable is set to indicate whether the OS is being used by the computer system as a native or as a virtualized OS. Thus, in such embodiments, the OS (such as $OS_1$ in FIG. 1) accesses the global variable during its runtime to determine whether it is being used as a native or as a virtualized OS, and the OS adapts its operation accordingly.

Continuing with the example of FIG. 1, if determined in decision block 100 that $OS_1$ is being used in a native operating environment 101, $OS_1$ adapts its operation to act as a native OS (Native $OS_1$ 10A) to manage hardware resources 13 of the computer system and support its respective applications, such as Applications A 14 and B 15 in this example. On the other hand, if determined in decision block 100 that $OS_1$ is being used in a virtualized operating environment 102, $OS_1$ adapts its operation to act as a paravirtualized OS (paravirtualized $OS_1$ 10B) to manage hardware resources 13 of the computer system and support its respective applications, such as Applications A 14 and B 15 in this example. Virtualized operating environment 102 (which may be referred to as a virtual machine) includes one or more other virtualized (e.g., guest or host) OSs, such as paravirtualized $OS_2$ 11 supporting its respective applications (Applications C 16 and D 17 in this example). For instance, paravirtualized $OS_1$ may provide a first type of OS, such as Windows™, and paravirtualized $OS_2$ may provide a second type of OS, such as Linux.

Virtualized operating environment 102 further includes VMM 12, which is also referred to herein as a "hypervisor." In general, VMM 12 is a software layer that virtualizes the available resources 13 of the computer and multiplexes them among one or more guest OSs on the computer system (such as $OS_1$ and $OS_2$). As mentioned above, a technique known as paravirtualization has been proposed to improve performance of virtualized OSs. As opposed to pure virtualization, in paravirtualization the OSs are modified specifically to use in a virtualized environment where privileged operations may be replaced with faster calls to the VMM that effect the same results. For instance, in paravirtualization the VMM 12 may provide an explicit API and allow or require a guest OS to port to the VMM 12. Thus, the paravirtualized OSs (such as paravirtualized $OS_1$ 10B and paravirtualized $OS_2$ 11 in FIG. 1) are capable of performing some privileged by making calls to the VMM 12 rather than requiring VMM 12 to intercept hardware traps (thereby minimizing the amount of performance diminishment when running virtualized).

In view of the above, certain embodiments provide a flexible OS that is capable of selectively acting as either a native OS or as a paravirtualized OS. Upon determining in which type of operating environment it is being used, the OS can either act as a native OS or it can act as a paravirtualized OS. As described further herein, such a paravirtualized OS can take special actions (e.g., make calls to VMM) to more efficiently cooperate with other OSs that may be operating on the computer system, thereby minimizing the amount of reduction in performance of such paravirtualized OS. Among the advantages of such a flexible OS is that a provider of the OS need only maintain/support one set of binary code in order to satisfy consumers desiring to use the OS as a native OS as well as those desiring to use the OS as a virtualized OS. That is, the same binary code may be loaded on a computer system for use as a native OS or it may be loaded on a computer system for use as paravirtualized OS. Techniques as described further herein may be used for allowing the OS to recognize how it is being used by the computer system (e.g., as either a native OS or as a paravirtualized OS) and the OS can adapt its operation accordingly. Thus, the various burdens associated with maintaining/supporting different OS products for native and virtualized operating environments is alleviated for an OS provider.

In the example of FIG. 1, $OS_1$ may be any OS now known or later developed, including without limitation HPUX™, UNIX, Linux, Windows™ (e.g., Windows XP, Windows CE, Windows NT, Windows ME, Windows 2000, etc.) Virtual Memory System (VMS), OS/400, AIX, and Tru64, that is adapted to be flexible to act as either a Native or a virtualized OS as described further herein. Additionally, in various embodiments, the computer system on which such OS is implemented may be selected from various different scales of computer systems, such as a portable computing device (e.g., a laptop computer, personal data assistant ("PDA"), mobile telephone, etc.), a personal computer (PC), or a large mainframe computer, as examples.

Figure 2:
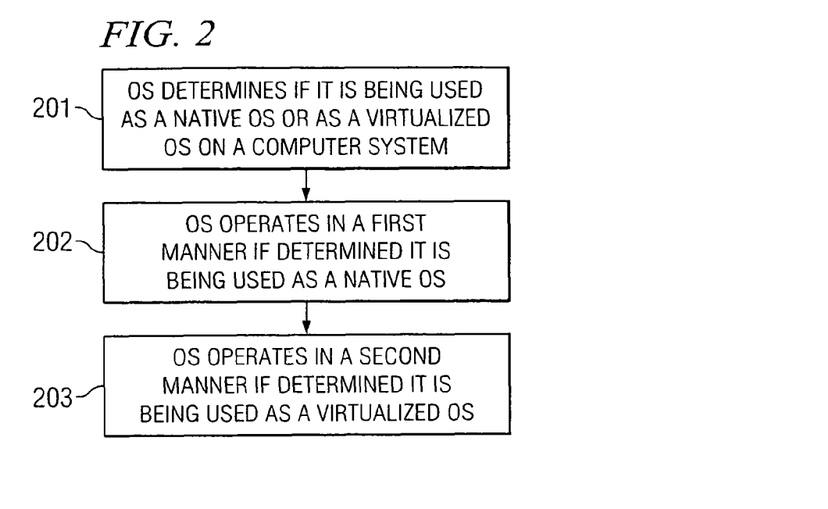
FIG. 2 shows a general operational flow diagram of an embodiment of a flexible OS, such as OS, of FIG. 1.

FIG. 2 shows a general operational flow diagram of an embodiment of a flexible OS, such as $OS_1$ of FIG. 1. In operational block 201, the OS determines if it is being used as a native OS or as a virtualized OS on a computer system. As described further below, in certain embodiments, a global variable is set during the computer system's boot-up process to identify whether the OS is to be used as a native or as a virtualized OS, and the OS accesses such global variable during its runtime to determine how it is being used. In block 202, the OS operates in a first manner if determined that it is being used as a native OS. For instance, when acting as a native OS the OS need not be concerned with cooperating with other OSs on the system, as in a virtual environment. In block 203, the OS operates in a second manner if determined that it is being used as a virtualized OS. For instance, when operating in a virtualized environment (e.g., on a virtual machine) the OS may act as a paravirtualized OS such that it takes special action in performing certain privileged operations (e.g., makes calls to the VMM) so as to minimize the amount of performance diminishment.

Figure 3:
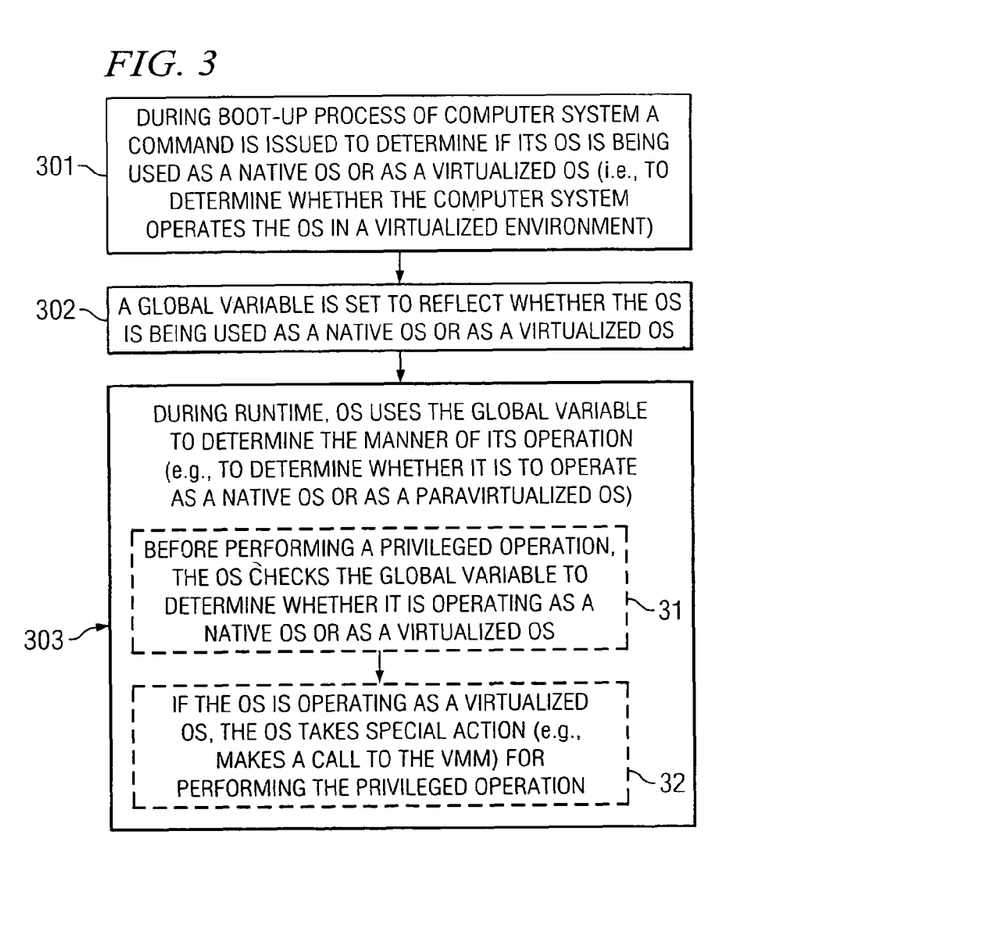
FIG. 3 shows, in greater detail, an example operational flow diagram of a system implementing a flexible OS in accordance with certain embodiments.

FIG. 3 shows, in greater detail, an example operational flow diagram of a system implementing a flexible OS in accordance with certain embodiments. In operational block 301, a command is issued during the boot-up process of the system to determine if its OS is being used as a native OS or as a virtualized OS. For example, in the "move from DCR" privileged instruction, for some architectures (e.g., Itanium), certain hardware configuration states are indicated to be either enabled or disabled by the setting of certain bits in the target general register. The architecture defines that some of the bits (for example, bit 63) in the DCR are "reserved" and the "move from DCR" instruction will always set the corresponding bit in the general register to zero. So if an OS executes this instruction directly when it is running native (and thus privileged), bit 63 will always be set to zero. When the OS is running virtualized, however, the attempt to execute this privileged instruction will result in a trap which is delivered to the VMM. The VMM will instead set bit 63 in the target register to a one (1) to signal the OS that it is indeed running virtualized. While certain examples are provided herein with reference to the Itanium processor architecture, any processor architecture that provides a mechanism (e.g., a register) that indicates (or may be adapted for indicating) whether an OS is running native or virtualized may be utilized in accordance with embodiments of a flexible OS described further herein.

In operational block 302, a global variable is set to reflect whether the OS is being used as a native OS or as a virtualized OS. For instance, the global variable is set to a first value (e.g., 0) if the OS is being used as a native OS, or it is set to a second value (e.g., 1) if the OS is being used as a virtualized OS. Such global variable is any new variable declared by the paravirtualized OS to record an indication of the operating environment in which the OS is being used (e.g., to record the result of bit 63 in the above example).

During runtime, the OS uses the global variable to determine the manner of its operation, in block 303. That is, the OS uses the global variable to determine whether it is being used as a native OS or as a virtualized OS, and it adapts its operation accordingly. As shown in the optional dashed blocks 31 and 32 of block 303, in certain embodiments, the OS checks the global variable before performing certain privileged operations to determine whether it is operating as a native OS or as a virtualized OS (block 31), and if the OS is operating as a virtualized OS, it takes special action (block 32) for performing the certain privileged operations, e.g., making calls to the VMM) so as to reduce the performance diminishment of the virtualized OS. For example, "if" statements (or other types of checks) are coded into the flexible OS in certain embodiments such that the OS checks the value of the global variable before performing certain privileged operations. In this manner, if the global variable indicates that the OS is being used in a virtualized environment, the OS adapts its operation to effectively act as a paravirtualized OS (whereby it makes calls to the VMM for certain privileged operations); otherwise, the OS acts as a native OS.

As described further below, the privileged operations to be handled special (by making calls to the VMM) by the OS (if operating in a virtualized environment) may be intelligently selected so as to minimize performance diminishment. That is, the OS need not be modified to make calls to the VMM for all privileged operations that may be encountered, but instead the VMM may be relied upon for intercepting traps for certain privileged operations when the OS is being used in the virtualized environment. In other words, the above-mentioned "if statements" for checking the global variable may be intelligently distributed in the OS so as to check the global variable and modify the OS's operation (in the event that the global variable indicates the OS is running virtualized) for certain privileged operations. Somewhat of a conflict often arises between the desire to minimize the amount of performance degradation encountered when operating the OS virtualized (e.g., by minimizing the amount of privileged operations that require interception of traps by the VMM) versus the desire to limit the amount of changes to the native OS for achieving the paravirtualized OS. In certain embodiments, an intelligent balance is struck by the OS when acting as a paravirtualized OS by selecting certain ones of the privileged operations to be handled special by the OS (so as to make calls to the VMM) that yield the greatest performance benefit. Other privileged operations that are encountered infrequently and/or that have less performance cost are left to be intercepted by the VMM. In this manner, when being used in a virtualized environment, the OS acts as an optimized paravirtualized OS.

As a concrete example of an embodiment that implements a flexible OS, an example implementation of a flexible OS in an IA-64 architecture, and more specifically the Itanium architecture, is now described. As was previously noted, the present Itanium architecture is not fully virtualizable. An example implementation, referred to herein as vBlades, is used for virtualizing the Itanium architecture in accordance with one embodiment, as described further below. While the specific vBlades implementation for the Itanium architecture is described in detail below, such vBlades implementation is intended as an example and the scope of the embodiments for a flexible OS are not intended to be limited to this example vBlades implementation. Rather, various other implementations may be utilized as consistent with the example embodiments described above with FIGS. 1-3. Further, such implementations are not limited to the Itanium (or other IA-64) architecture, but rather may be utilized for any other uncooperative architecture. For instance, the specific details concerning the example vBlades implementation may be adapted for various other uncooperative architectures.

IA-64 is a 64-bit processor architecture co-developed by Hewlett-Packard Company and Intel Corporation, which is based on Explicitly Parallel Instruction Computing (EPIC). Itanium is a well-known family of processors based on the IA-64 architecture. The Itanium family includes processors such as those having the code names of MERCED, MCKINLEY, and MADISON. In addition to supporting a 64-bit processor bus and a set of 128 registers, the 64-bit design of Itanium allows access to a very large memory (VLM) and exploits features in EPIC. While a specific example implementation (referred to as "vBlades") of one embodiment is described below for the Itanium architecture, such implementation is intended solely as an example that enables various embodiments for application to other IA-64 architectures. Further, embodiments of a flexible OS are not limited in application to an IA-64 architecture, but may be applied as well to other architectures (e.g., IA-32, etc.). The example techniques described herein for determining whether such a flexible OS is being used as a native OS or as a virtualized OS may be adapted as will be readily recognized to those of ordinary skill in the art for use within any uncooperative architecture (i.e., that is not fully virtualizable).

Processor architecture generally comprises corresponding supporting firmware. For example, the IA-64 processor architecture comprises such supporting firmware as Processor Abstraction Layer (PAL), System Abstraction Layer (SAL), and Extended Firmware Interface (EFI). Such supporting firmware may enable, for example, the OS to access a particular function implemented for the processor. For instance, the OS may query the PAL as to the size of the cache implemented for the processor, etc. Other well-known functions provided by the supporting firmware (SAL, EFI) include, for example: (a) performing I/O configuration accesses to discover and program the I/O Hardware (SAL_PCI_CONFIG_READ and SAL_PCI_CONFIG_WRITE); (b) retrieving error log data from the platform following a Machine Check Abort (MCA) event (SAL_GET_STATE_INFO); (c) accessing persistent store configuration data stored in non-volatile memory (EFI variable services: GetNextVariableName, GetVariable and SetVariable); and accessing the battery-backed real-time clock/calendar (EFI GetTime and SetTime). Accordingly, the supporting firmware, such as the PAL, is implemented to provide an interface to the processor(s) for accessing the functionality provided by such processor(s). Each of those interfaces provide standard, published procedure calls that are supported.

Figure 4:
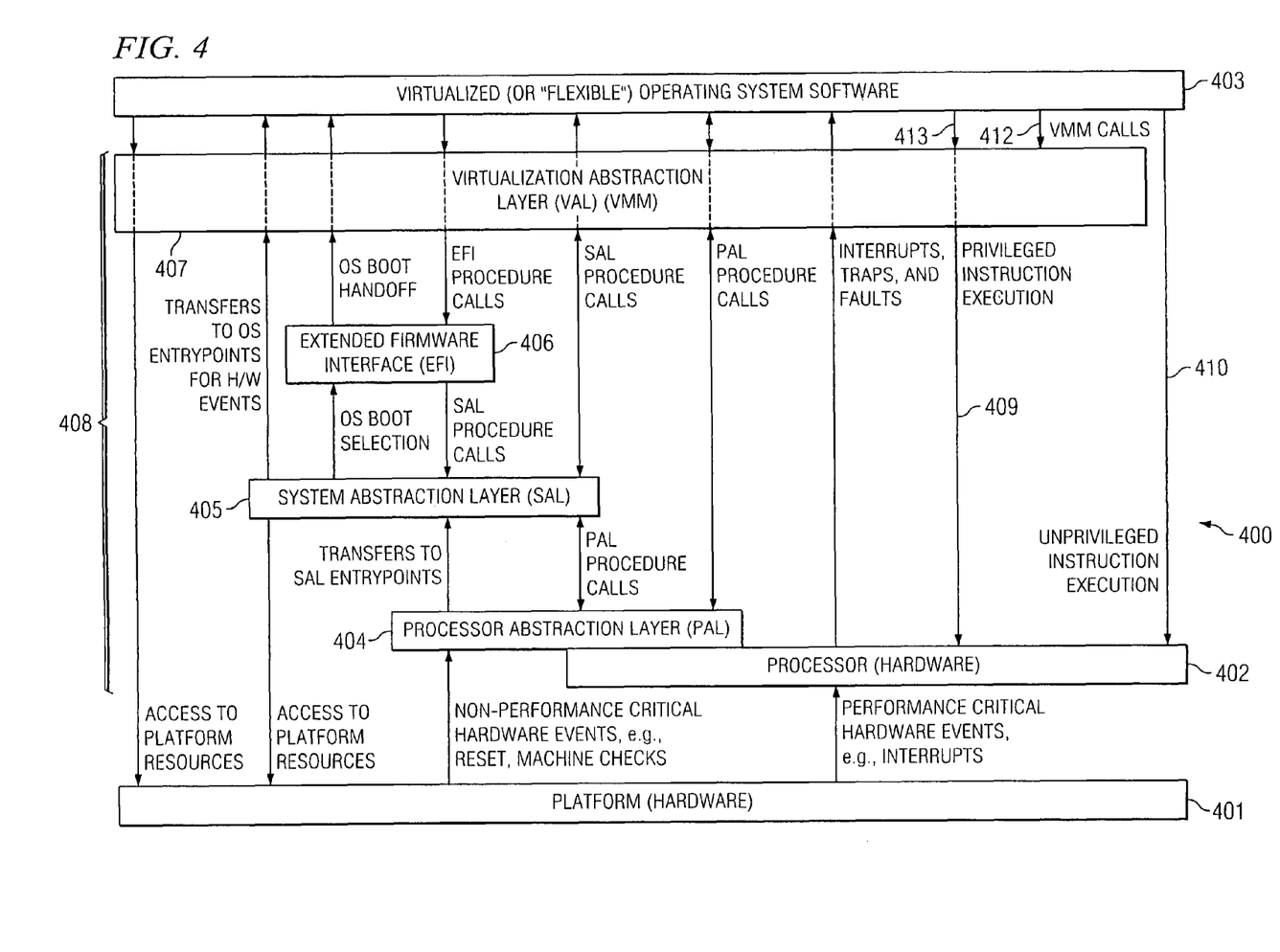
FIG. 4 shows a block diagram of the traditional Itanium architecture adapted to be virtualized in accordance with one embodiment.

FIG. 4 shows a block diagram of the traditional Itanium architecture adapted to be virtualized in accordance with one embodiment. More specifically, this example implementation (referred to as "vBlades") adds virtualization abstraction layer (VAL) 407 to the traditional Itanium architecture in order to implement a hypervisor as described below. The quintessential model of the traditional IA-64 architecture is given in the *Intel IA-64 Architecture Software Developer's Manual*, Volume 2: *IA-64 System Architecture*, in section 11.1 *Firmware Model*, the disclosure of which is hereby incorporated herein by reference. FIG. 4 shows an abstract model of an example system 400, which comprises hardware platform 401, processor(s) 402, OS 403 (which in this example is a virtualized or flexible OS), and system firmware 408. In this example implementation, supporting system firmware 408 comprises PAL 404, SAL 405, EFI 406, and VAL 407. PAL 404, SAL 405, EFI 406, and VAL 407 together provide, among other things, the processor and system initialization for an OS boot. Hardware platform 401 represents the collection of all of the hardware components (resources) of system 400, other than the system's processors 402.

The arrows shown in the abstract model of FIG. 4 between these various components indicate the types of permitted interactions for the behavior of system 400. The boot-up process of a traditional Itanium system proceeds as follows: When system 400 is first powered on, there are some sanity checks (e.g., power on self-test) that are performed by microprocessors included in platform 401, which are not the main system processors 402 that run applications. After those checks have passed, power and clocks are given to processor 402. Processor 402 begins executing code out of the system's Read-Only Memory (ROM) (not specifically shown in FIG. 4). The code that executes is the PAL 404, which gets control of system 400. PAL 404 executes to acquire all of the processors 402 such that the processors begin executing concurrently through the same firmware.

After it has performed its duty of initializing the processor(s) 402, PAL 404 passes control of system 400 to SAL 405. It is the responsibility of SAL 405 to discover what hardware is present on platform 401, and initialize it to make it available for the OS 403, primarily main memory. When main memory is initialized and functional, the firmware 408 is copied into the main memory. Then, control is passed to EFI 406, which is responsible for activating boot devices, which typically includes the disk. EFI 406 reads the disk to load a program into memory, typically referred to as an operating system loader. EFI 406 loads the OS loader into memory, and then passes it control of system 400 by branching one of the processors 402 (typically called the boot startup processor) into the entry point of such OS loader program.

The OS loader program then uses the standard firmware interfaces 408 to discover and initialize system 400 further for control. One of the things that the OS loader typically has to do in a multi-processor system is to retrieve control of the other processors. For instance, at this point in a multi-processor system, the other processors may be executing in do-nothing loops. In an Advanced Configuration and Power Interface (ACPI)-compatible system, OS 403 makes ACPI calls to parse the ACPI tables to discover the other processors of a multi-processor system 400 in a manner as is well-known in the art. Then OS 403 uses the firmware interfaces 408 to cause those discovered processors to branch into the operating system code. At that point, OS 403 controls all of the processors and the firmware 408 is no longer in control of system 400.

As OS 403 is initializing, it has to discover from the firmware 408 what hardware is present at boot time. And in the ACPI standards, it also discovers what hardware is present or added or removed at run-time. Further, the supporting firmware (PAL, SAL, EFI, and VAL) are also used during system runtime to support the processor. For example, OS 403 may access a particular function of the processor 402 via the supporting firmware 408, such as querying PAL 404 for the number, size, etc., of the processor's cache. Some other well-known firmware functions that OS 403 may employ during runtime include: (a) PAL 404 may be invoked to configure or change processor features such as disabling transaction queuing (PAL_BUS_SET_FEATURES); (b) PAL 404 may be invoked to flush processor caches (PAL_CACHE_FLUSH); (c) SAL 405 may be invoked to retrieve error logs following a system error (SAL_GET_STATE_INFO, SAL_CLEAR_STATE_INFO); (d) SAL 405 may be invoked as part of hot-plug sequences in which new I/O cards are installed into the hardware (SAL_PCI_CONFIG_READ, SAL_PCI_CONFIG_WRIT); (e) EFI 406 may be invoked to change the boot device path for the next time the system reboots (SetVariable); (f) EFI 406 may be invoked to change the clock/calendar hardware settings; and (g) EFI 406 may be invoked to shutdown the system (ResetSystem).

Except for the VAL 407, the interfaces illustrated in the firmware model of FIG. 4 (EFI procedure calls, SAL Procedure Calls, PAL Procedure Calls, Transfers to SAL entry-points, OS Boot Handoff, OS entrypoints for hardware events) are well-defined interfaces in the art for this example processor architecture. Any IA-64 hardware system that complies with this model should work with any OS that also complies with this model. The architecture definition is interface-based, however, and the internal implementation of the firmware (SAL and EFI) is not specified by the architecture. Only the interfaces between the firmware and the OS and the PAL and the SAL are specified by this architecture. Therefore, vendors are free to innovate within their firmware implementation provided they adhere to both the architectural (and legal) requirements of employing such IA-64 Processors (e.g., ITANIUM, etc.).

During the boot-up process of the above-described architecture, the platform SAL 405 (generally written by the OEM who resells the IA-64 processors and PAL 404 in a system)

copies PAL 304 into main memory. SAL 405 writes an address to architected EFI tables identifying the entry point to the PAL procedure. OS 403, in turn, retrieves the address for the PAL procedures and employs it whenever calling the PAL procedures.

In the boot process of the example implementation 400, the VAL (or VMM) 407 acts as the OS for all boot steps. That is, in this case the VMM 407 acts as the OS in the above-described boot process. When booting in such a virtualized environment, the VMM 407 continues by loading one or more "guest" operating systems, such as OS 403. Then, during the runtime of guest OS 403, it may attempt to perform certain privileged operations 413, which are intercepted by VMM 407 for handling such privileged operation 409 according to the resources "visible" to virtualized OS 403. Additionally, OS 403 may perform various unprivileged operations 410 without any action needed by VMM 407. Further, when operating as a paravirtualized OS, OS 403 may be operable to make VMM calls 412 to VMM 407 for performing certain privileged operations, which are handled by VMM 407 according to the resources visible to virtualized OS 403. As described above, making such calls 412 to VMM 407 improves the performance of virtualized OS 403 over implementations in which VMM 407 is required to intercept all privileged operations (as with privileged operations 413).

As described further below, the example vBlades implementation supports both virtualization and paravirtualization. The vBlades VMM handles emulation of privileged operations, such as operations 413, while the vBlades VAL 407 also provides an API that may be used by ported guests, such as for VMM calls 412. The components may be used separately or together. That is, OSs may run fully virtualized, undertake a complete port to the VAL 407, or use the facilities in combination. In other words, OS 403 may be a "pure" virtual OS in which all privileged operations are intercepted by VMM 407, as with operations 413, or OS 403 may be implemented as a paravirtual OS to take advantage of the VMM API to make calls, such as calls 412, to VMM 407. This example architecture implementation supports either type of OS implementation. By starting with a fully (or "pure") virtualized OS, making performance measurements for selected benchmarks, then adding VMM calls to resolve performance issues, an optimal balance can be found between the magnitude of the required modifications to the OS and performance. Such a hybrid approach is referred to herein as optimized paravirtualization.

In many cases, replacing emulation of a single privileged operation with a single VMM service call provides negligible savings. However, if a group of privileged operations can be replaced by a single VMM service call, significant performance improvements can result. For example, when a guest is performing a task switch it will usually update several (or all) of the region registers with address space values appropriate for the new task. Rather than making a VMM call for each individual region register, one VMM service allows all eight to be updated with a single call. Thus, such "batching" is utilized for certain operations in the example vBlades implementation.

As described above, performance advantages are recognized through paravirtualization. As also noted above, there are disadvantages to requiring a separate binary for running native versus running as a guest on a virtual machine. If an OS can determine whether or not it is running virtualized, it can make optimal execution choices at runtime and the same binary can be used. This may be referred to herein as transparent paravirtualization.

The example vBlades implementation utilizes a reserved bit in a privileged configuration register to let the OS know whether or not it is running virtualized. According to the Itanium architecture definition, reserved bits in the configuration register are always set to zero. When the vBlades VMM 407 executes the privileged instruction that returns this register, it sets one of the reserved bits to one. Thus, an OS can execute this instruction early in the startup process and conditionally set a global variable to record whether or not it is running as a vBlades guest. Once this variable is set, subsequent transparent code can test the variable and react accordingly, such as described further in the example flow of FIG. 5.

Figure 5:
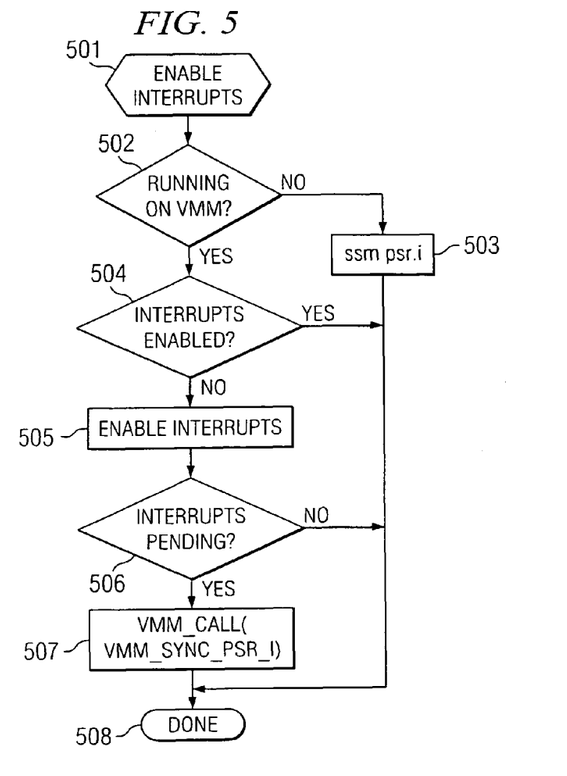
FIG. 5 shows an operational flow diagram for an example of a flexible OS determining whether it is running native or virtualized and acting accordingly.

FIG. 5 shows an operational flow diagram for an example of a flexible OS 403 determining whether it is running native or virtualized and acting accordingly in the example vBlades implementation of FIG. 4. More specifically, the example operational flow of FIG. 5 is for the frequent OS action of enabling external device interrupts. In operational block 501, the OS calls the procedure "Enable Interrupts." That is, "Enable Interrupts" 501 is the procedure name in this example flow. In operational block 502, a determination is made by the OS whether it is running virtualized (e.g., whether it is running on VAL 407). As described above, this determination is made in certain embodiments by checking a global variable that identifies whether the OS is running as a native OS or as a virtual OS. If determined in block 502 that the OS is not running virtualized (but is instead running as a native OS), operation advances to block 503 whereat a (hardware) privileged instruction (in assembly code) "ssm psr.i" is performed in the example Itanium architecture for enabling external device interrupts. The procedure then ends in operational block 508.

On the other hand, if determined in block 502 that the OS is running virtualized, operation advances to block 504 whereat a determination is made as to whether the external device interrupts are enabled. If they are already enabled, then the procedure ends at block 508. If the external device interrupts are not enabled, then an active execution is performed in block 505 to enable such interrupts. In block 506 a determination is made as to whether any interrupts are pending. If no interrupts are pending, then the procedure ends in block 508. If interrupts are pending, then operation advances to block 507 whereat a call is made by the OS 403 to VMM 407 via "VMM_CALL(VMM_SYNC_PSR_I)" to synchronize the processor status register for the pending interrupts. The procedure then ends in block 508.

As one example of an OS determining whether it is operating native or virtualized and adapting its operation accordingly, consider the following pseudo-code that may be implemented in an OS in accordance with certain embodiments:

```
fetch_processor_status( )
{
    if (running_on_vmm)
        p=VMM_CALL(GET_PSR)
    else [mov GRp=psr.1]
    return p
}
```

In the above example, the "fetch_processor_status( )" function is used to fetch the processor status word. The "if" statement (i.e., if (running_on_vmm)) tests the global variable to determine whether the OS is running as a native or as a virtualized OS. If running on VMM, the p=VMM_CALL (GET_PSR) instruction calls the VMM to get the processor status word. Thus, this call to the VMM is utilized by the OS when it determines that it is running virtualized, rather than native, in order to optimize its performance. Otherwise, the OS executes the IA-64 machine instruction directly (i.e., else [mov GRp=psr.1]). In either case, the function returns the result (return p).

As another example, consider the following pseudo-code that may be implemented in an OS for handling another type of privileged operation:

```
request_size_of_memory( )
{
  if (running_on_vmm)
      memory_size=VMM_CALL(GET mem_size)
  else
      call PAL to determine which sequences of physical memory are valid
      memory_size=sum of the size of all sequences
  endif
  return memory_size
}
```

In the above example, the "request_size_of memory( )" function is used to retrieve the size of memory available for use by the OS. The "if" statement (i.e., if (running_on_vmm)) again tests the global variable to determine whether the OS is running as a native or as a virtualized OS. If running on VMM, the memory_size=VMM_CALL(GET mem_size) instruction calls the VMM to get the memory size for the OS. Thus, this call to the VMM is utilized by the OS when it determines that it is running virtualized, rather than native, in order to optimize its performance. Otherwise, the OS executes the proper instructions (e.g., IA-64 machine instructions) directly to determine the memory size, which in this example calls the PAL to determine which sequences of physical memory are valid and then summing all of the sizes of the determined valid sequences to obtain the memory_size. In either case, the function returns the result (return memory_size).

As still another example, consider the following pseudo-code that may be implemented in an OS for handling another type of privileged operation:

```
discover_IO_devices( )
{
  if (running_on_vmm)
      IO_devices=VMM_CALL(GET IO_devs)
  else
      IO_devices=call ACPI routines to discover IO devices
  endif
  return IO_devices
}
```

In the above example, the "discover_IO_devices( )" function is used to retrieve the 10 devices available for use by the OS. The "if" statement (i.e., if (running_on_vmm)) again tests the global variable to determine whether the OS is running as a native or as a virtualized OS. If running on VMM, the IO_devices=VMM_CALL(GET IO_devs) instruction calls the VMM to discover the (virtual) 10 devices that are available to the OS. Thus, this call to the VMM is utilized by the OS when it determines that it is running virtualized, rather than native, in order to optimize its performance. Otherwise, the OS executes the proper instructions (e.g., ACPI routines) directly to discover the (physical) IO devices that are available to it. In either case, the function returns the result (return IO_devices).

From the above pseudo-code, those of ordinary skill in the art will recognize how to implement specific instructions within a given OS for achieving a flexible OS capable of recognizing its environment (e.g., either native or virtualized) and adapting its operation accordingly. The above technique of utilizing a conditional test within the OS for determining whether it is running native or virtualized and adapting its operation accordingly may be used for any number of various privileged operations, and are therefore not limited to the specific examples described above.

In a transparently paravirtualized OS, the above-described conditional test for determining whether the OS is operating as a native or as a virtualized OS may occur with relatively high frequency. Every piece of paravirtualized code performs the test. When running as a guest, the incremental cost of the additional test is small relative to virtualization overhead. We conjectured that the cost when running native would also be small. First, in a fully paravirtualized guest, the number of tests is at most one per privileged instructions, Second, the frequency of privileged instructions in all but the most system-centric micro-benchmarks is at least two to three orders of magnitude lower than unprivileged instructions. Third, a well-defined paravirtualization interface eliminates many privileged instructions. Finally, high frequency access to the conditional test variable ensures its presence in cache memory, guaranteeing a low cycle count for the conditional test.

To test our conjecture, we ran a simple but non-trivial benchmark: Linux compiling itself. The difference was indeed negligible, with the magnitude dwarfed by the natural variability in the benchmark result. While more precise measurements with a more comprehensive set of benchmarks are still to be conducted, we expect to find that degradation is less than 0.1% when running native. Thus, we believe that the performance impact of the proposed transparent paravirtualization on the OS when acting as a native OS is essentially, as its name would imply, transparent.

Assuming that it is desirable to limit the number of changes to the guest OS, while also desirable to minimize the performance degradation of the paravirtualized guest OS; an iterative and subjective process may be undertaken to optimize the paravirtualized guest OS. For instance, some guests may have stringent requirements on code change, while others may be much more focused on performance. We refer to the process of reaching an optimal balance between these conflicting goals as optimized paravirtualization.

An example process for determining an optimized paravirtualization for one embodiment is now described with reference to the example vBlades implementation. To measure the degree of change to the guest OS, we define the set of changes necessary to implement paravirtualization as the porting footprint. Changes to the guest fall into two categories: invasive changes and supporting changes. Invasive changes are those that affect one or more existing source or build files. Supporting changes are newly added source or build files that provide VMM support code necessary for interfacing to the vBlades VMM 407 but do not affect existing code; these are generally linked in as a library. We believe that invasive changes have, by far, the most significant impact on OS maintenance. Consequently, we restrict our definition of porting footprint for the below analysis to include only invasive changes.

To support data-driven performance decisions, vBlades is highly instrumented, it records and tabulates all VMM calls 412, privileged operations, exception deliveries, etc. This level of detail is not only used for porting but can also provide an interesting perspective on the operation of the original pre-ported guest.

The vast majority of application and guest instructions executed in any benchmark are unprivileged, executed at full speed and are thus irrelevant to a comparison. Since the guest is executing unprivileged in the example vBlades implementation, all privileged instructions are either emulated by the vBlades VMM 407 (as with the instructions 413 in FIG. 4) or replaced and paravirtualized through VMM calls 412. We will refer to these collectively as ring crossings. Of course, each ring crossing is slower than the native privileged instruction it replaces—perhaps by two to three orders of magnitude. Consequently, reducing the total number of ring crossings improves performance. Further, a VMM call 412 is somewhat less costly than VMM emulation since emulation involves the VMM fetching (or intercepting) and decoding the privileged instruction. Thus, replacing an emulated privileged instruction with an equivalent VMM call 412 also improves performance.

With this in mind, we present ring-crossing results from the previously introduced benchmark (Linux compiling itself) at different stages of optimized paravirtualization of Linux 2.4.20. Prior to the execution of the benchmark, all vBlades counters are zeroed; thus privileged instructions and VMM calls necessary to initialize the system are ignored. The ring crossing results of the different stages of optimization of the OS 403 in this example are graphically represented in FIG. 6. The second y-axis shows the cumulative porting footprint measured in lines of code. The results of the various stages of this example optimization process are discussed further below.

Figure 6:
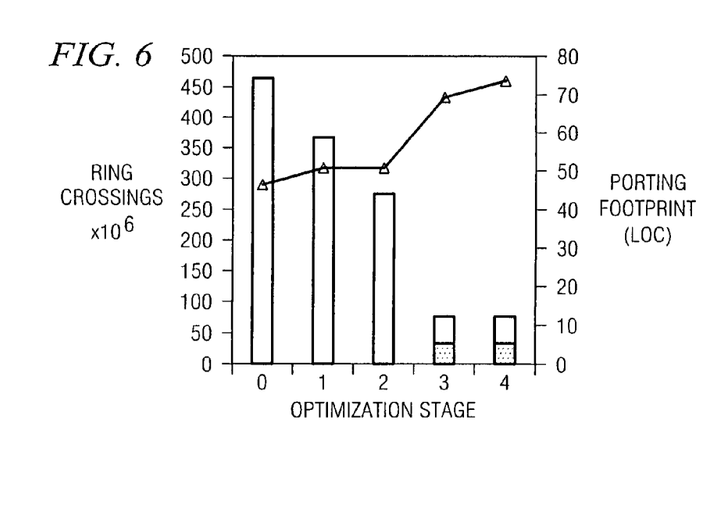
FIG. 6 shows the ring crossing results of the different stages for optimizing a paravirtual OS in accordance with one embodiment.

In stage 0, only a minimal set of changes is introduced into Linux to allow it to run as a vBlades guest. There are approximately 474 million ring crossings, all of them due to privileged instructions. These changes have a porting footprint of 46 lines.

In stage 1, we replace Linux interrupt enable/disable code with the VMM call mechanism described above. Because of the highly organized nature of the Linux source code, the vast majority of code that enables or disables interrupts uses preprocessor macros defined in a single include file; these macros utilize the Itanium rsm and ssm instructions. We redefine these macros using a patch that has a porting footprint of only four lines. With this minor change, almost 171 million (23%) of the privileged operations are eliminated and replaced with less than one million VMM calls, reducing ring crossings to 363 million.

In stage 2, we introduce a vBlades-specific Interruption Vector Table (IVT). In Itanium, the IVT is the entry point for all interruption handlers, including synchronous exceptions such as Translation Look-aside Buffer (TLB) faults as well as timer and external device interrupts. Since Itanium interruption handlers obtain and manipulate state by reading and writing privileged registers, the IVT contains many privileged instructions. As previously described, these can be replaced with normal loads and stores to the PSCB.

In this example implementation, Linux running on Itanium indicates the location of the IVT by storing the address in privileged cr.iva register exactly once early in architecture dependent startup code, prior to the possibility of any interruption. Replacing the original Linux IVT with a VMM-aware IVT could be as simple as conditionally assigning a different location to cr.iva. However, the VMM sensing code should execute prior to any interruption. So, in this example implementation we instead allow the original code to set cr.iva to point to the original Linux IVT, then reset it in the VMM sensing code to point to the VMM-aware IVT. As a result, there is no additional porting footprint for this change.

The resultant reduction in ring crossings, however, is significant—now down to 274 million.

Every entry into the Linux kernel must have a corresponding exit, and just as the IVT reads numerous privileged registers, many of these same privileged registers must be written when returning to interrupted user code. In stage 3 of this example optimization process, we replace the central Linux kernel exit code with a VMM-aware version, a change that has a porting footprint of 19 lines and provides a dramatic improvement in the number of privileged operations, which is now reduced to 48 million. We also see the first significant increase in VMM calls—a total of 32 million, visible on the bar chart of FIG. 6 as the shaded portion of the bar shown in stage 3. One VMM_RESUME call, the equivalent of the Itanium rfii instruction, is made for each kernel exit. The total number of ring crossings is now 80 million.

In stage 4 of our example optimization process, we examine the benefit of the region register updates seen previously as an example of batching. When performing a task switch, Linux/ia64 changes five region registers using five consecutive privileged instructions. We replace all five privileged instructions with a single VMM call, using a patch that has a porting footprint of five lines. The benefits of this stage, though significant, are not as remarkable as the previous stages. We have replaced about 3.8 million privileged operations with about 0.7 million VMM calls, a net reduction of over 3 million ring crossings.

In some cases, a large reduction in ring crossings that yields significant performance improvements can be obtained with a very small porting footprint. In other cases, changes with a larger porting footprint may result in a negligible performance change. Through careful experimentation and measurement a suitable balance can be achieved.

In view of the above, various virtualization and paravirtualization issues for the Itanium processor family have been addressed by the example vBlades implementation. Further, an example optimization process has been described for determining an optimized paravirtualization for a given OS (e.g., Linux in the above example) that allows a balance to be reached between maximizing performance and minimizing the porting footprint (and maintenance impact) for the guest OS. We believe that, with a small porting footprint, performance of the optimized paravirtual OS can approach native operation. Additionally, an example implementation of transparent paravirtualization has been described above, which enables a single OS image to run either on a native system or on a VMM, thus improving maintainability at essentially no cost. While the above example implementation is described in connection with the specific Itanium architecture and Linux OS, the above techniques are not intended to be so limited in application. Rather, the above techniques may be readily adapted and applied in any uncooperative architecture and for any OS desired to be made flexible such that it can operate as either a native or as a virtualized OS (e.g., paravirtualized OS for improved performance) in this manner.

When implemented via computer-executable instructions, various elements of embodiments described herein for providing a flexible OS capable of selectively acting as either a native OS or as a virtualized (e.g., paravirtualized) OS are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 7:
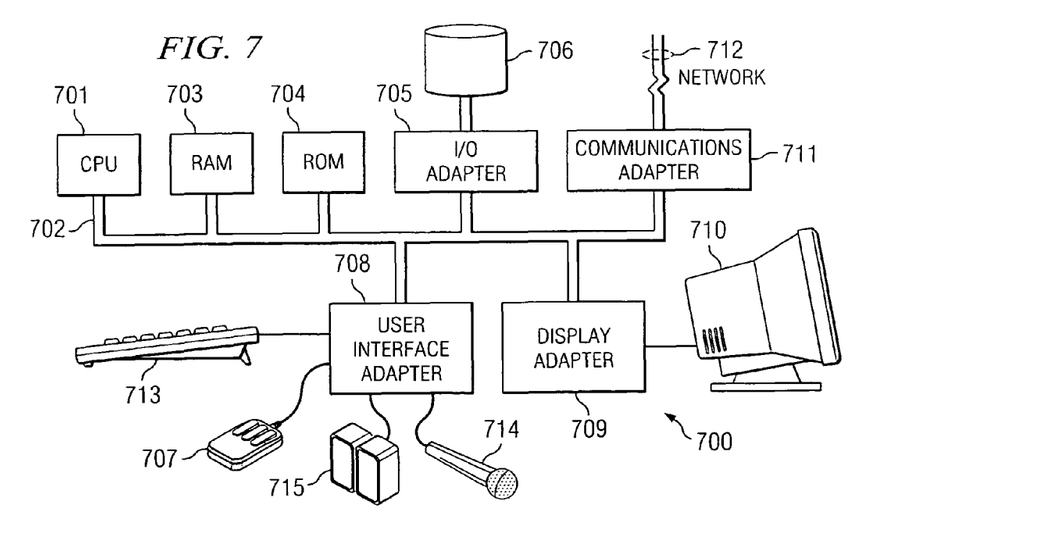
FIG. 7 shows an example computer system on which certain embodiments of a flexible OS may be implemented.

FIG. 7 illustrates an example computer system 700 adapted according to an embodiment for implementing such a flexible OS. That is, computer system 700 may be a computer system on which such flexible OS is to run as a native OS (e.g., $OS_1$ 10A of FIG. 1), or computer system 700 may be a computer system on which the flexible OS is to run as a paravirtualized OS (e.g., $OS_1$ 10B of FIG. 1). Thus, computer system 700 comprises an example system on which embodiments described herein may be implemented. Of course, embodiments are not limited in application solely to the example computer system 700 of FIG. 7, but may instead be implemented on various of types of processor-based systems, including without limitation laptops, PDAs, mobile telephones, mainframe computers, etc.

In the example computer system 700, central processing unit (CPU) 701 is coupled to system bus 702. CPU 701 may be any general purpose CPU. As described above, in certain embodiments the CPU 701 is an IA-64 processor, such as the Itanium processor. Of course, in other embodiments, CPU 701 may comprise a different processor architecture, including without limitation an IA-32 architecture. CPU 701 may execute the various logical instructions according to embodiments described herein. For example, CPU 701 may execute machine-level instructions according to the exemplary operational flows described above in conjunction with FIGS. 2, 3, and 5.

Computer system 700 also preferably includes random access memory (RAM) 703, which may be SRAM, DRAM, SDRAM, or the like. Computer system 700 preferably includes read-only memory (ROM) 704 which may be PROM, EPROM, EEPROM, or the like. RAM 703 and ROM 704 may hold user and system data and programs, including a flexible OS as described above.

Computer system 700 also preferably includes input/output (I/O) adapter 705, communications adapter 711, user interface adapter 708, and display adapter 709. I/O adapter 705, user interface adapter 708, and/or communications adapter 711 may, in certain embodiments, enable a user to interact with computer system 700 in order to input information thereto.

I/O adapter 705 preferably connects storage device(s) 706, such as one or more of hard drive, compact disc (CD) drive, floppy disk drive, tape drive, etc. to computer system 700. The storage devices may be utilized when RAM 703 is insufficient for the memory requirements associated with storing data for application programs. RAM 703, ROM 704, and/or storage devices 706 may be used for storing computer-executable code for virtualizing an uncooperative architecture (e.g., the VAL and hypervisor code for the above-described vBlades implementation for virtualizing the Itanium architecture) and/or computer-executable code for a flexible OS that is capable of determining how it is being used by the computer system and accordingly adapt its operation to act as either a native OS or as a paravirtual OS in accordance with the embodiments described above. Communications adapter 711 is preferably adapted to couple computer system 700 to network 712, which may be, as examples, the Internet or other Wide Area Network (WAN), a local area network (LAN), a wireless network, public (or private) switched telephony network (PSTN), any combination of the above, or any other communication network now known or later developed within the networking arts which permits two or more computers to communicate with each other.

User interface adapter 708 couples user input devices, such as keyboard 713, pointing device 707, and microphone 714 and/or output devices, such as speaker(s) 715 to computer system 700. Display adapter 709 is driven by CPU 701 to control the display on display device 710.

It shall be appreciated that the embodiments of implementing a flexible OS described herein are not limited to the architecture of system 700. For example, any suitable processor-based device may be utilized, including without limitation personal computers, laptop computers, computer workstations, and multi-processor servers.

What is claimed is:

1. A computer system comprising:
   at least one processor; and
   a flexible operating system executable on the at least one processor to:
   determine whether said flexible operating system is being used as a native operating system or as a virtualized operating system on said computer system, wherein the determining is based on checking a variable set during a boot process of the computer system; and
   execute in a first manner as a native operating system on the computer system in response to detecting that said flexible operating system is being used as the native operation system, and execute in a second manner as a virtualized operating system on said computer system in response to detecting that said flexible operating system is being used as the virtualized operating system,
   wherein said flexible operating system is configured to operate in a non-virtualized environment when said flexible operating system is being used as the native operating system, and is configured to operate in a virtualized environment when said flexible operating system is being used as the virtualized operating system.

2. The computer system of claim 1 wherein said flexible operating system executing in said second manner comprises said operating system acting as a paravirtualized operating system.

3. The computer system of claim 2 wherein said paravirtualized operating system is operable to make a call to a Virtual Machine Monitor (VMM) for performing at least one privileged operation.

4. The computer system of claim 1, wherein said flexible operating system is executable to further:
   make a call to a Virtual Machine Monitor (VMM) for performing at least one privileged operation when the flexible operating system is executed in the second manner as the virtualized operating system.

5. The computer system of claim 4 wherein making the call to said VMM uses an Application Program Interface (API) defined for said VMM.

6. The computer system of claim 1, wherein the virtualized operating system is configured to manage hardware resources of the system by using a virtual machine monitor (VMM), and wherein the native operating system is configured to manage the hardware resources in the non-virtualized environment without using the VMM.

7. The computer system of claim 1, wherein the at least one processor is configured to selectively set the variable to one of plural values during the boot process, a first of the plural values to indicate that the flexible operating system is to be used as the native operating system, and a second of the plural values to indicate that the flexible operating system is to be used as the virtualized operating system, wherein the flexible operating system is executable to check the variable during runtime after the boot process.

8. A computer system comprising:
at least one processor; and
a flexible operating system executable on the at least one processor to:
determine whether said flexible operating system is being used as a native operating system or as a virtualized operating system on said computer system; and
execute in a first manner as a native operating system on the computer system in response to detecting that said flexible operating system is being used as the native operation system, and execute in a second manner as a virtualized operating system on said computer system in response to detecting that said flexible operating system is being used as the virtualized operating system,
wherein said flexible operating system is configured to operate in a non-virtualized environment when said flexible operating system is being used as the native operating system, and is configured to operate in a virtualized environment when said flexible operating system is being used as the virtualized operating system,
wherein said flexible operating system executing in said second manner comprises said operating system acting as a paravirtualized operating system, wherein said paravirtualized operating system is operable to make a call to a Virtual Machine Monitor (VMM) for performing at least one privileged operation,
wherein said flexible operating system is executable to determine whether said flexible operating system is being used as the native operating system or the virtualized operating system by:
checking a global variable that indicates whether said flexible operating system is being used as the native operating system or as the virtualized operating system on said computer system.

9. The computer system of claim 8, wherein said flexible operating system is executable to further:
execute an instruction which, when the flexible operating system is being used as the virtualized operating system, causes a Virtual Machine Monitor (VMM) to set at least one configuration bit to a first value, and when the flexible operating system is being used as the native operating system, causes the VMM to set said at least one configuration bit to a different value.

10. A method comprising:
implementing at least one operating system on a computer system;
determining, by said at least one operating system in said computer system, whether said at least one operating system is a native operating system or a guest operating system on a virtual machine, wherein the determining is based on checking a variable set during a boot process of the computer system;
said at least one operating system operating in a first manner if determined that it is a native operating system, wherein the native operating system operates in a non-virtualized environment; and
said at least one operating system operating in a second manner if determined that it is a guest operating system on a virtual machine, wherein the guest operating system operates in a virtual environment provided by the virtual machine.

11. The method of claim 10 wherein said determining comprises:
said at least one operating system determining during runtime based on the variable whether the at least one operating system is being used as said native operating system or as said guest operating system on the virtual machine.

12. The method of claim 11 wherein said variable is a global variable.

13. The method of claim 10 wherein said first manner comprises said native operating system managing hardware resources of the computer system.

14. The method of claim 13 wherein said second manner comprises said guest operating system having access to the computer system hardware resources that are managed by a Virtual Machine Monitor (VMM).

15. The method of claim 14 wherein said guest operating system makes, for at least one privileged operation, a call to the VMM.

16. The method of claim 10, further comprising:
selectively setting the variable to one of plural values during the boot process, a first of the plural values to indicate that the at least one operating system is to be used as the native operating system, and a second of the plural values to indicate that the at least one operating system is to be used as the guest operating system; and
the at least one operating system checking the variable during runtime after the boot process.

17. A computer system comprising:
at least one processor;
a virtual machine monitor (VMM); and
an operating system executable on the at least one processor to:
determine whether said operating system is running as a virtualized operating system or a native operating system, wherein the determining is based on checking a variable set during a boot process of the computer system; and
adapt operation of said operating system depending on whether it is running as the virtualized operating system or native operating system, wherein the native operating system is configured to manage hardware resources in a non-virtualized environment without the VMM, and wherein the virtualized operating system is configured to manage hardware resources using the VMM.

18. The computer system of claim 17 wherein said variable is a global variable.

19. The computer system of claim 18 wherein said operating system is executable to check said value of said global variable before performing certain privileged operations.

20. The computer system of claim 17 wherein said operating system is executable to perform the determining by determining, before execution of certain privileged instructions, whether said operating system is running as the virtualized operating system or native operating system.

21. The computer system of claim 17 wherein said operating system when running as the virtualized operating system executes privileged instructions by making at least one call to the VMM.

22. The computer system of claim 17 wherein said operating system performs the determining by executing an instruction which, when the operating system is being used as the virtualized operating system, causes the VMM to set at least one configuration bit to a first value.

23. The computer system of claim 22 wherein said operating system performs the determining by further determining whether said operating system is running as the virtualized operating system or native operating system based at least in part on a determined value of at least one configuration bit after execution of said instruction.

24. The computer system of claim 17, wherein the at least one processor is configured to selectively set the variable to one of plural values during the boot process, a first of the plural values to indicate that said operating system is to be used as the native operating system, and a second of the plural values to indicate that said operating system is to be used as the virtualized operating system, wherein said operating system is executable to check the variable during runtime after the boot process.

25. A system comprising:

hardware resources;

a virtual machine monitor (VMM); and a flexible operating system for managing said hardware resources, wherein said flexible operating system is operable to determine whether it is running in a virtualized environment or in a native, non-virtualized environment, wherein the determining is based on checking a variable set during a boot process of the system, wherein said flexible operating system is operable to selectively execute in a first manner if determined that said flexible operating system is running in the native environment and in a second manner if determined that said flexible operating system is running in the virtualized environment, wherein in the first manner said flexible operating system is configured to manage said hardware resources without using the VMM, and wherein in the second manner said flexible operating system is configured to manage said hardware resources using the VMM.

26. The system of claim 25 wherein said first manner comprises acting as a native operating system.

27. The system of claim 25 wherein said second manner comprises acting as a virtualized operating system.

28. The system of claim 27 wherein said virtualized operating system is operable to make a call to the VMM for performing at least one privileged operation.

29. The system of claim 25 wherein said flexible operating system is configured to adapt its operation to make a call to said VMM for performance of at least one privileged instruction when said flexible operating system determines that said flexible operating system is running in the virtualized environment.

30. A system comprising:

at least one processor;

a flexible operating system executable on the at least one processor and that is capable of acting as either a native operating system or as a virtualized operating system; and the flexible operating system executable to determine whether the flexible operating system is to be used as a native operating system in a non-virtualized environment without a Virtual Machine Monitor (VMM) or as a virtualized operating system in a virtualized environment with the VMM, wherein the flexible operating system is executable to check a variable set during a boot process of the system for determining whether the flexible operating system is being used as the native or as the virtualized operating system.

31. The system of claim 30 wherein the flexible operating system is executable to make the determination during runtime of the system.

32. The system of claim 30 further comprising:

means for virtualizing resources of said system and multiplexing said resources among one or more virtualized operating systems.

33. The system of claim 32, further comprising at least one processor configured to selectively set the variable to one of plural values during the boot process, a first of the plural values to indicate that the flexible operating system is to be run in the native environment, and a second of the plural values to indicate that the flexible operating system is to be fun in the virtualized environment, wherein the flexible operating system is operable to check the variable during runtime after the boot process.

34. The system of claim 30 wherein if determined that said flexible operating system is being used as the virtualized operating system, said flexible operating system is configured to act as the virtualized operating system.

35. The system of claim 30 wherein if determined that said flexible operating system is being used as the native operating system, said flexible operating system is configured to act in a first manner, and if determined that said flexible operating system is being used as the virtualized operating system, said flexible operating system is configured to act in a second manner.

36. The system of claim 30, wherein the virtualized operating system is configured to manage hardware resources of the system by using the VMM, and wherein the native operating system is configured to manage the hardware resources in the non-virtualized environment without using the VMM.

* * * * *

UNITED STATES PATENT AND TRADEMARK OFFICE
CERTIFICATE OF CORRECTION

| | | |
|---|---|---|
| PATENT NO. | : 7,877,747 B2 | Page 1 of 1 |
| APPLICATION NO. | : 10/784065 | |
| DATED | : January 25, 2011 | |
| INVENTOR(S) | : Daniel J. Magenheimer | |

It is certified that error appears in the above-identified patent and that said Letters Patent is hereby corrected as shown below:

In column 20, line 30, in Claim 33, delete "fun" and insert -- run --, therefor.

Signed and Sealed this
Seventeenth Day of May, 2011

David J. Kappos
*Director of the United States Patent and Trademark Office*